United States Patent
Boyer

(10) Patent No.: US 10,130,239 B2
(45) Date of Patent: Nov. 20, 2018

(54) FILTER ASSEMBLY FOR A DISHWASHER APPLIANCE

(71) Applicant: Haier US Appliance Solutions, Inc., Wilmington, DE (US)

(72) Inventor: Joel Charles Boyer, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 54 days.

(21) Appl. No.: 15/216,784

(22) Filed: Jul. 22, 2016

(65) Prior Publication Data

US 2018/0020900 A1    Jan. 25, 2018

(51) Int. Cl.
| | | |
|---|---|---|
| *A47L 15/42* | (2006.01) | |
| *C02F 1/00* | (2006.01) | |
| *B01D 29/64* | (2006.01) | |
| *B01D 29/86* | (2006.01) | |
| *B01D 29/01* | (2006.01) | |
| *B01D 29/58* | (2006.01) | |

(52) U.S. Cl.
CPC ....... *A47L 15/4208* (2013.01); *A47L 15/4219* (2013.01); *A47L 15/4225* (2013.01); *B01D 29/01* (2013.01); *B01D 29/58* (2013.01); *B01D 29/6476* (2013.01); *B01D 29/86* (2013.01); *C02F 1/001* (2013.01); *C02F 2303/26* (2013.01); *C02F 2307/12* (2013.01)

(58) Field of Classification Search
CPC ............. A47L 15/4208; A47L 15/4225; A47L 15/4219; B01D 29/01; B01D 29/58; B01D 29/6476; B01D 29/86; C02F 1/001; C02F 2303/26; C02F 2307/12
See application file for complete search history.

(56) References Cited

U.S. PATENT DOCUMENTS

| | | | | |
|---|---|---|---|---|
| 4,201,345 A | * | 5/1980 | Ziegler | ............... A47L 15/4227 241/46.012 |
| 6,103,017 A | * | 8/2000 | Thies | .................. A47L 15/0049 134/10 |
| 6,182,674 B1 | * | 2/2001 | Jozwiak | .............. A47L 15/0049 134/104.1 |

(Continued)

FOREIGN PATENT DOCUMENTS

| | | |
|---|---|---|
| CN | 202991593 U | 6/2013 |
| EP | 0469302 A1 | 2/1992 |

*Primary Examiner* — Michael E Barr
*Assistant Examiner* — Benjamin L Osterhout
(74) *Attorney, Agent, or Firm* — Dority & Manning, P.A.

(57) ABSTRACT

A filter assembly for filtering a wash fluid to be circulated by a circulation pump in a dishwasher appliance includes a discharge blade defining lateral, transverse and vertical directions. The discharge blade includes a blade hub and a pair of opposing blades, and each of the opposing blades extend outward from the blade hub to a blade tip along the lateral direction. Further, each opposing blade may include a leading edge, a trailing edge, a top surface, and a bottom surface. The trailing edge of at least one opposing blade may be spaced apart from the leading edge along both the transverse and vertical directions, and may define a curve extending between the blade hub and blade tip along the lateral direction. Still further, the top surface of the at least one opposing blade may define a slope between the leading edge and the trailing edge along the transverse direction.

18 Claims, 14 Drawing Sheets

(56) References Cited

U.S. PATENT DOCUMENTS

| | | | |
|---|---|---|---|
| 6,314,642 B1* | 11/2001 | Thompson | F04C 2/101 |
| | | | 29/428 |
| 6,454,872 B1* | 9/2002 | Miller | A47L 15/4202 |
| | | | 134/10 |
| 7,350,527 B2 | 4/2008 | Gurubatham et al. | |
| 7,670,439 B2* | 3/2010 | Elick | A47L 15/4204 |
| | | | 134/111 |
| 8,714,167 B2 | 5/2014 | Yoon et al. | |
| 9,211,047 B2 | 12/2015 | Fountain et al. | |
| 2013/0174879 A1 | 7/2013 | Welch | |
| 2014/0109938 A1 | 4/2014 | Geda et al. | |
| 2014/0238446 A1 | 8/2014 | Welch | |
| 2016/0206173 A1* | 7/2016 | Durham | A47L 15/4202 |

* cited by examiner

FILTER ASSEMBLY FOR A DISHWASHER APPLIANCE

FIELD OF THE INVENTION

The present subject matter relates generally to dishwasher appliances and more particularly to filter assemblies for dishwasher appliances.

BACKGROUND OF THE INVENTION

During wash and rinse cycles, dishwasher appliances generally circulate a fluid through a wash chamber over articles, such as pots, pans, silverware, etc. The fluid can be, e.g., various combinations of water and detergent during the wash cycle, or water (which may include additives) during the rinse cycle. Typically, the fluid is circulated during a given cycle using a pump. Fluid is collected at or near the bottom of the wash chamber and pumped back into the wash chamber through, e.g., nozzles in spray arms and other openings that direct the fluid against the articles to be cleaned or rinsed.

Depending upon the level of soil on the articles, fluids used during wash and rise cycles can become contaminated with soils in the form of debris or particles that are carried with the fluid. In order to protect the pump and recirculate the fluid through the wash chamber, it is beneficial to filter the fluid so that relatively clean fluid is applied to the articles in the wash chamber and soils are removed or reduced from the fluid supplied to the pump.

Accordingly, dishwasher appliances are generally provided with a filter assembly to trap at least certain of the soils carried with the wash fluid. Such filter assemblies generally include a coarse filter and a fine filter in a series flow configuration. For example, during a wash cycle a portion of the recirculated wash fluid progressively flows through filters that have smaller and smaller holes. Additionally, blades may be provided adjacent the filters to generally unclog soil from the filters and guide the soil towards discharge areas. It is generally desirable for these blades to be in close proximity to respective filters to facilitate such cleaning.

While such filter assemblies provide advantages with regard to filtering, improvements could be made with respect to the discharge of soil from the filters. For example, blades of current filter assemblies expel soil radially outward towards and into discharge areas. However, due to their design, these blades cannot lift soil off of the filter screen along a vertical direction Accordingly, improved filter assemblies are desired. In particular, filter assemblies which provide improved soil discharge would be advantageous.

BRIEF DESCRIPTION OF THE INVENTION

Aspects and advantages of the invention will be set forth in part in the following description, or may be apparent from the description, or may be learned through practice of the invention.

In a first exemplary embodiment, a filter assembly for filtering a wash fluid to be circulated by a circulation pump in a dishwasher appliance is provided. The filter assembly defines an axial direction, and may include a filter member, a circumferential discharge member, and a discharge blade. The filter member may include a filter panel, and may also define a discharge opening. The circumferential discharge member may be disposed radially outward of the filter member, and the discharge chamber may be in fluid communication with the filter member through the discharge opening. The discharge blade defines lateral, transverse and vertical directions, and may be attached to a shaft of the filter assembly that extends through the filter member and is rotatable about the axial direction. Further, the discharge blade may be positioned adjacent to the filter panel, and may further include a blade hub and a pair of opposing blades. The blade hub may define an aperture, and the shaft may extend through the aperture such that the discharge blade is attached to the shaft and rotatable about the axial direction. The pair of opposing blades may extend outward from the blade hub to a blade tip along the lateral direction, and each of the opposing blades may include leading and trailing edges and top and bottom surfaces. Further, the trailing edge of at least one opposing blade may be spaced apart from the leading edge along both the transverse and vertical directions such that the trailing edge defines a curve extending between the blade hub and blade tip along the lateral direction. Still further, the top surface of the at least one opposing blade may define a slope between the leading edge and the trailing edge along the transverse direction.

In a second exemplary embodiment, a dishwasher appliance is provided. The dishwasher appliance includes a tub, a sump, a circulation pump, and a filter assembly. The filter assembly defines an axial direction, a radial direction, and a circumferential direction. The filter assembly may include a filter member, a circumferential discharge member, and a discharge blade. The filter member may include a filter panel, and may also define a discharge opening. The circumferential discharge member may be disposed radially outward of the filter member, and the discharge chamber may be in fluid communication with the filter member through the discharge opening. The discharge blade defines lateral, transverse and vertical directions, and may be attached to a shaft of the filter assembly that extends through the filter member and is rotatable about the axial direction. Further, the discharge blade may be positioned adjacent to the filter panel, and may further include a blade hub and a pair of opposing blades. The blade hub may define an aperture, and the shaft may extend through the aperture such that the discharge blade is attached to the shaft and rotatable about the axial direction. The pair of opposing blades may extend outward from the blade hub to a blade tip along the lateral direction, and each of the opposing blades may include leading and trailing edges and top and bottom surfaces. Further, the trailing edge of at least one opposing blade may be spaced apart from the leading edge along both the transverse and vertical directions such that the trailing edge defines a curve extending between the blade hub and blade tip along the lateral direction. Still further, the top surface of the at least one opposing blade may define a slope between the leading edge and the trailing edge along the transverse direction.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
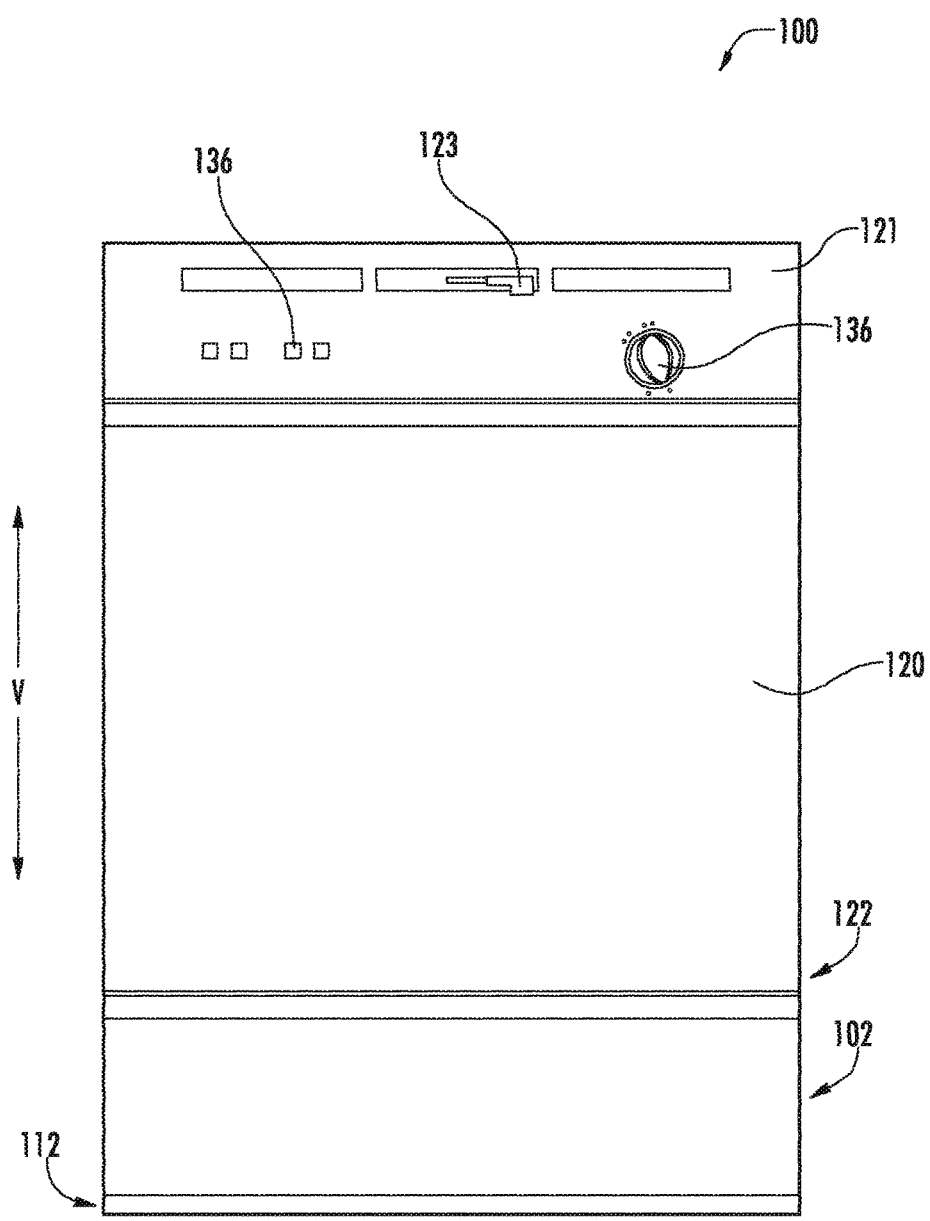
FIG. 1 provides a front elevation view of a dishwasher appliance in accordance with an exemplary embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", "third", "fourth", etc. may be used interchangeably to distinguish one component from another and are not intended to signify location or importance of the individual components.

Figure 2:
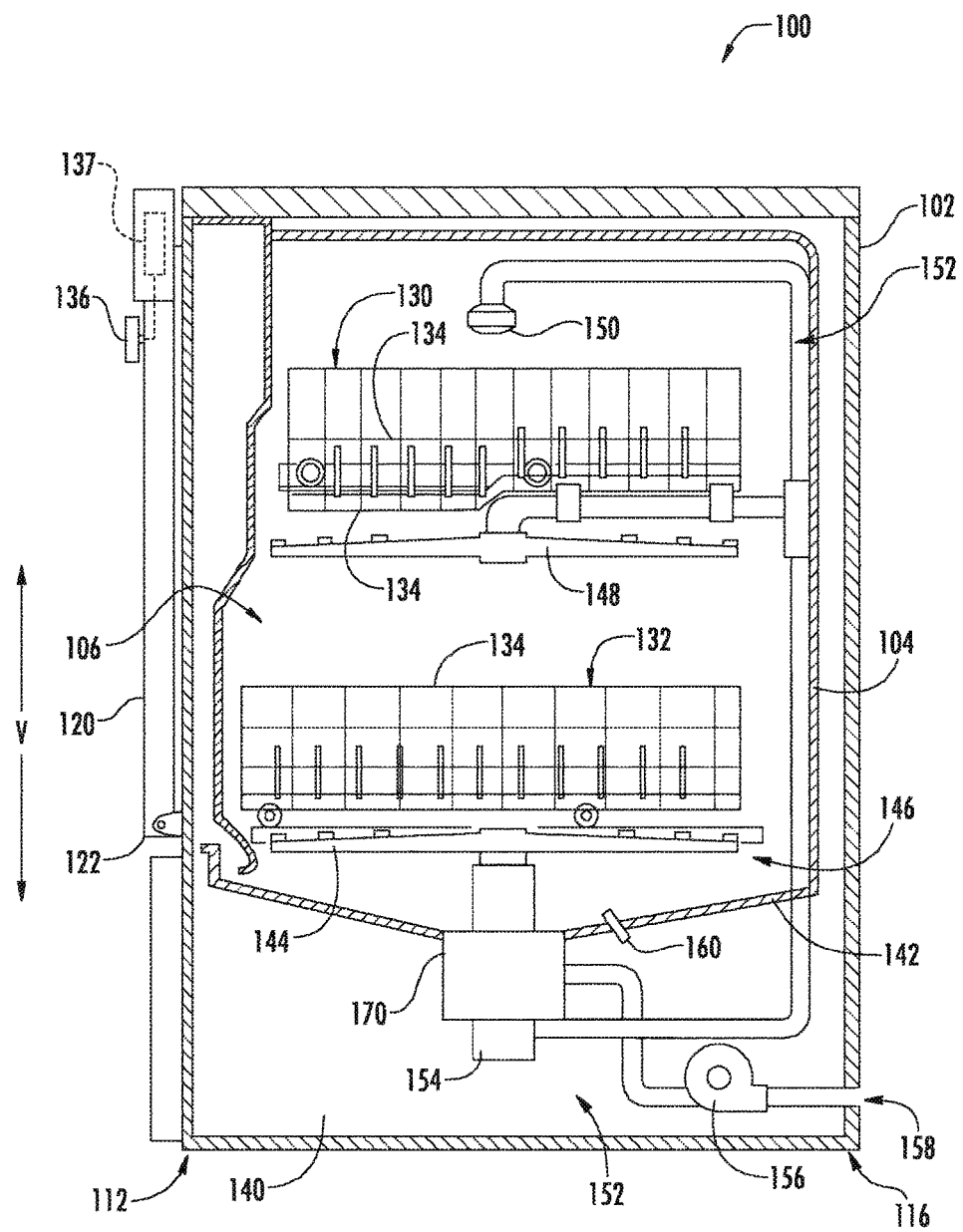
FIG. 2 provides a side, sectional view of the exemplary dishwasher appliance of FIG. 1.

FIGS. 1 and 2 depict a dishwasher appliance 100 according to an exemplary embodiment of the present subject matter. FIG. 1 provides a front view of the exemplary dishwasher appliance 100, and FIG. 2 provides a side, sectional view of the exemplary dishwasher appliance 100.

As shown, dishwasher appliance 100 defines a vertical direction V and includes a cabinet 102. Cabinet 102 has a tub 104 therein that defines a wash chamber 106. The tub 104 also defines a front opening (not shown). Dishwasher appliance 100 includes a door 120 hinged at a bottom 122 of door 120 for movement between a normally closed, vertical position (shown in FIGS. 1 and 2), wherein wash chamber 106 is sealed shut for washing operation, and a horizontal, open position for loading and unloading of articles from dishwasher appliance 100. A latch 123 is used to lock and unlock door 120 for access to wash chamber 106. Tub 104 also includes a sump assembly 170 shown schematically positioned adjacent a bottom portion 112 of tub 104 and configured for receipt of a liquid wash fluid (e.g., water, detergent, wash fluid, and/or any other suitable fluid) during operation of dishwasher appliance 100. More particularly, sump assembly 170 is shown attached to a bottom wall 142 of tub 104. As will be explained in greater detail below, the exemplary dishwasher appliance 100 may further include a filter assembly (not shown), such as a filter assembly 204 (see FIG. 3), disposed within sump assembly 170.

A spout 160 is positioned adjacent sump assembly 170 of dishwasher appliance 100. Spout 160 is configured for directing liquid into sump assembly 170. Spout 160 may receive liquid from, e.g., a water supply (not shown) or any other suitable source. In alternative embodiments, spout 160 may be positioned at any suitable location within dishwasher appliance 100, e.g, such that spout 160 directs liquid into tub 104. Spout 160 may include a valve (not shown) such that liquid may be selectively directed into tub 104. Thus, for example, during the cycles described below, spout 160 may selectively direct water and/or wash fluid into sump assembly 170 as required by the cycle of dishwasher appliance 100.

Rack assemblies 130 and 132 are slidably mounted within wash chamber 106. Each of the rack assemblies 130 and 132 is fabricated into lattice structures including a plurality of elongated members 134. Each rack of the rack assemblies 130 and 132 is adapted for movement between an extended loading position (not shown) in which the rack is substantially positioned outside the wash chamber 106, and a retracted position (shown in FIGS. 1 and 2) in which the rack is located inside the wash chamber 106. A silverware basket (not shown) may be removably attached to rack assembly 132 for placement of silverware, utensils, and the like, that are otherwise too small to be accommodated by the racks 130 and 132.

Dishwasher appliance 100 further includes a lower spray assembly 144 that is rotatably mounted within a lower region 146 of the wash chamber 106 and above sump assembly 170 so as to rotate in relatively close proximity to rack assembly 132. A mid-level spray assembly 148 is located in an upper region of the wash chamber 106 and may be located in close proximity to upper rack 130. Additionally, an upper spray assembly 150 may be located above the upper rack 130.

The lower and mid-level spray assemblies 144 and 148 and the upper spray assembly 150 are fed by a fluid circulation assembly 152 for circulating water and/or dishwasher fluid (collectively, "wash fluid") in the tub 104. Fluid circulation assembly 152 may include a wash or circulation pump 154 and a cross-flow/drain pump 156 located in a machinery compartment 140 located below sump assembly 170 of the tub 104, as generally recognized in the art. Cross-flow/drain pump 156 is configured for urging wash fluid within sump assembly 170 out of tub 104 and dishwasher appliance 100 to a drain 158. Circulation pump 154 is configured to provide a flow of recirculated wash fluid to tub 104 and wash chamber 106. More particularly, circulation pump 154 is configured for supplying a flow of wash fluid from sump assembly 170 to spray assemblies 144, 148 and 150 via a plurality of circulation conduits (not labeled).

Each spray assembly 144 and 148 includes an arrangement of discharge ports or nozzles for directing wash fluid onto dishes or other articles located in rack assemblies 130 and 132. The arrangement of the discharge ports in spray assemblies 144 and 148 provides a rotational force by virtue of wash fluid flowing through the discharge ports. The resultant rotation of the lower spray assembly 144 provides coverage of dishes and other dishwasher contents with a spray of wash fluid.

Dishwasher appliance 100 is further equipped with a controller 137 (shown in phantom) to regulate operation of the dishwasher appliance 100. Controller 137 may include a memory and microprocessor, such as a general or special purpose microprocessor operable to execute programming instructions or micro-control code associated with a cleaning cycle. The memory may represent random access memory such as DRAM, or read only memory such as ROM or FLASH. In one embodiment, the processor executes programming instructions stored in memory. The memory may be a separate component from the processor or may be included onboard within the processor. Alternatively, controller 137 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

Controller 137 may be positioned in a variety of locations throughout dishwasher appliance 100. In the illustrated embodiment, controller 137 may be located within a control panel area 121 of door 120 as shown. In such an embodiment, input/output ("I/O") signals may be routed between the control system and various operational components of dishwasher appliance 100 along wiring harnesses that may be routed through the bottom 122 of door 120. Typically, controller 137 includes a user interface 136 through which a user may select various operational features and modes and monitor progress of the dishwasher appliance 100. In one embodiment, user interface 136 may represent a general purpose I/O ("GPIO") device or functional block. Additionally or alternatively, user interface 136 may include input components, such as one or more of a variety of electrical, mechanical or electro-mechanical input devices including rotary dials, push buttons, and touch pads. User interface 136 may include a display component, such as a digital or analog display device designed to provide operational feedback to a user. User interface 136 may be in communication with controller 137 via one or more signal lines or shared communication busses.

It should be appreciated that the subject matter disclosed herein is not limited to any particular style, model or configuration of dishwasher appliance, and that the embodiment depicted in FIGS. 1 and 2 is for illustrative purposes only. For example, instead of the racks 130 and 132 depicted in FIG. 1, dishwasher appliance 100 may be of a known configuration that utilizes drawers that pull out from the cabinet and are accessible from the top for loading and unloading of articles.

Figure 3:
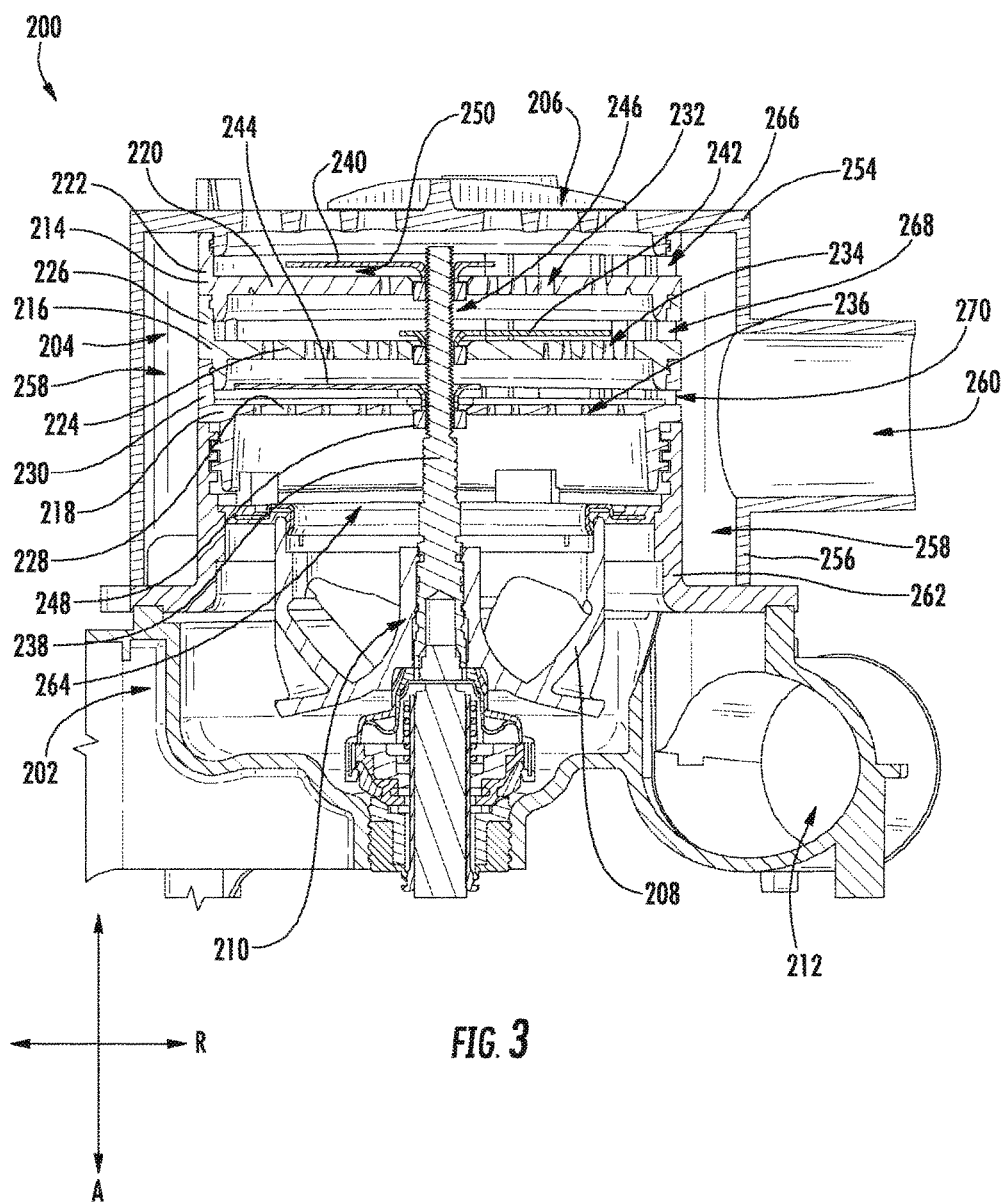
FIG. 3 provides a side, cross-sectional view of a sump and circulation pump in accordance with an exemplary embodiment of the present disclosure.
Figure 4:
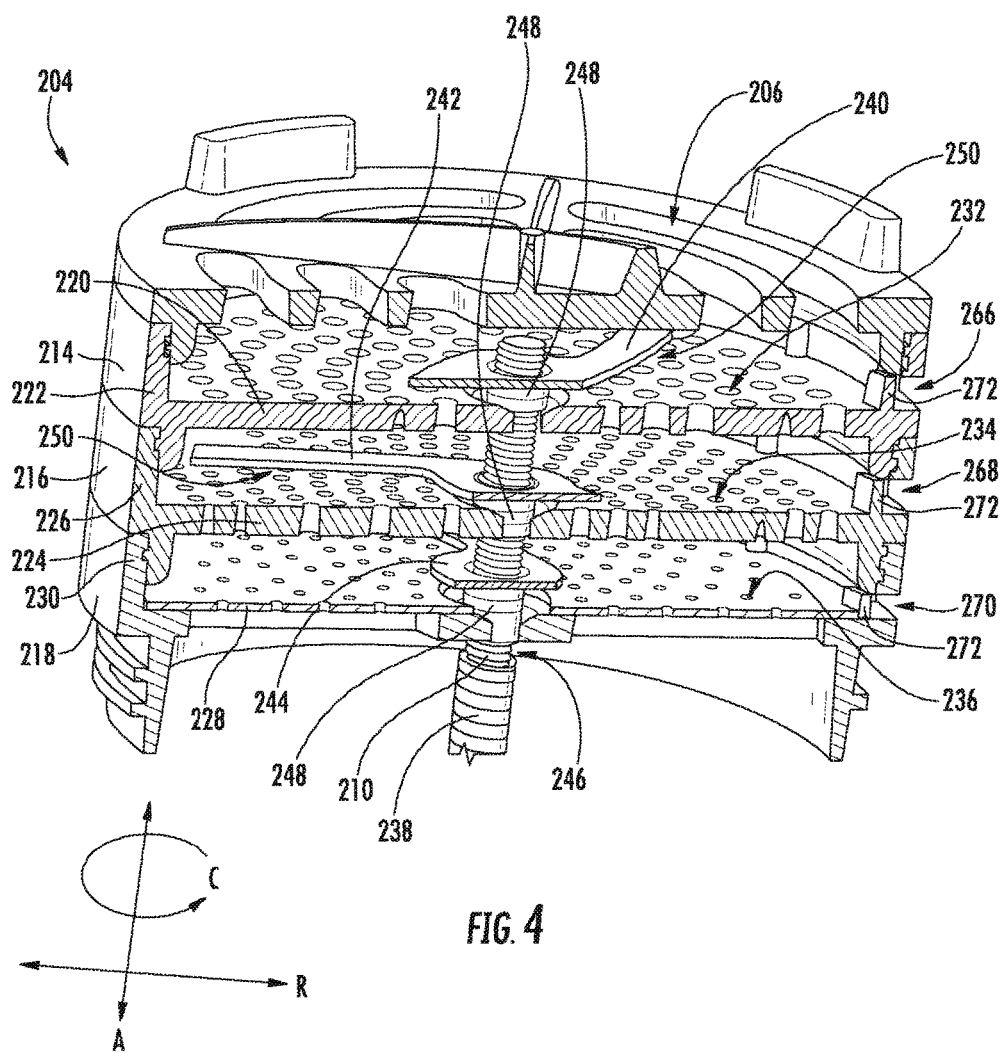
FIG. 4 provides a perspective cross-sectional view of a filter assembly in accordance with an exemplary embodiment of the present disclosure.

Reference will now be made to FIGS. 3 and 4. FIG. 3 provides a cross-sectional view of a portion of a sump 200 and circulation pump 202 in accordance with an exemplary embodiment of the present disclosure. Additionally, FIG. 4 provides a cross-sectional and perspective view of a filter assembly 204 in accordance with an exemplary embodiment of the present disclosure. In certain exemplary embodiments, sump 200 and circulation pump 202 may be configured as sump assembly 170 and circulation pump 154 in the exemplary dishwasher appliance 100 of FIGS. 1 and 2.

As is depicted, sump 200 generally includes a filter assembly 204 disposed within sump 200, and filter assembly 204 defines an axial direction A, a radial direction R, and a circumferential direction C. Circulation pump 202 is positioned adjacent to filter assembly 204 and in flow communication with filter assembly 204. Circulation pump 202 is configured to circulate or recirculate water/wash fluid from wash chamber 106 of tub 104. More particularly, circulation pump 202 is configured to urge a flow of wash fluid to be recirculated from wash chamber 106 of dishwasher appliance 100, through an inlet 206 in sump 200, and through filter assembly 204. Inlet 206 of sump 200 may be configured as an opening, e.g., in a bottom wall 142 of tub 104 of dishwashing appliance 100. From filter assembly 204, circulation pump 202 is configured to provide the flow of wash fluid to the tub 104 and wash chamber 106, or more particularly to provide the flow of wash fluid through one or more circulation conduits to one or more spray assemblies, such as spray assemblies 144, 148, 150 depicted in FIG. 2.

Circulation pump 202 generally includes an impeller 208, a shaft 210, and an electric motor (not shown). Shaft 210 extends generally along the axial direction A, and is rotatable in the circumferential direction C (i.e., about the axial direction A) by the motor. Impeller 208 is fixed to shaft 210 and rotated by shaft 210. Rotation of impeller 208 in the circumferential direction C by shaft 210 generates the flow of wash fluid to be recirculated through filter assembly 204 and into an outlet 212 of circulation pump 202. Outlet 212 of circulation pump 202 may be fluidly connected with the one or more circulation conduits to circulate or recirculate the wash fluid. For example, outlet 212 of circulation pump 202 may provide wash fluid to the one or more spray assemblies, such as spray assemblies 144, 148, 150 depicted in FIG. 2.

For the exemplary embodiment depicted, filter assembly 204 generally includes a plurality of stacked filter members configured in series flow. Accordingly, wash fluid to be recirculated flows sequentially through each of the plurality of filter members prior to being recirculated by circulation pump 202. With such a configuration, all wash fluid circulated or recirculated by circulation pump 202 is filtered by each of the plurality of filter members before reaching the circulation pump 202. Therefore, all wash fluid to be recirculated by circulation pump 202 may be filtered in a "single-pass" through filter assembly 204.

More particularly, for the embodiment depicted, the one or more filter members include a first filter member 214, a second filter member 216, and a third filter member 218. First filter member 214 defines a first filter panel 220 and a first outer wall 222 extending around a perimeter of first filter panel 220. Similarly, second filter member 216 defines a second filter panel 224 and a second outer wall 226 extending around a perimeter of the second filter panel 224, and the third filter member 218 defines a third filter panel 228 with a third outer wall 230 extending around a perimeter of the third filter panel 228.

Additionally, each of the one or more filter members are attached such that the respective filter panels are substantially parallel to one another. For example, the first filter panel 220 is substantially parallel to both second filter panel 224 and third filter panel 228. Moreover, for the embodiment depicted, first outer wall 222 is attached to second outer wall 226 using a screw-type connection, and second outer wall 226 is attached to third outer wall 230 also using a screw-type connection. However, in other embodiments, first, second, and third outer walls 222, 226, 230 may each be attached to one another in any other suitable manner.

Each of first, second, and third filter panels 220, 224, 228 are configured to prevent soils, such as food particles or other debris, greater than a predetermined size for the respective filter panel from passing therethrough. Additionally, each of the plurality of filter members 214, 216, 218 are configured to sequentially filter and remove smaller particles from the wash fluid to be recirculated. More particularly, as is depicted, first filter panel 220 defines a plurality of first filter openings 232, second filter panel 224 defines a plurality of second filter openings 234, and third filter panel 228 defines a plurality of third filter openings 236. First filter openings 232 are larger than second filter openings 234, and second filter openings 234 are larger than third filter openings 236. Accordingly, first filter member 214 may be referred to as a "coarse" filter, second filter member 216 may be referred to as a "medium" filter member, and third filter member 218 may be referred to as a "fine" filter member. Therefore, filter assembly 204 depicted may filter all particles larger than third filter openings 236 from the wash fluid to be recirculated in a single-pass through filter assembly 204.

For the embodiment depicted, each of first filter panel 220, second filter panel 224, and third filter panel 228 are configured as a wall defining first filter openings 232, second filter openings 234, and third filter openings 236, respectively. However, in other exemplary embodiments, first, second, and/or third filter panels 220, 224, 228 may instead be configured to include any other suitable filter medium, such as, e.g., a mesh filter.

Shaft 210 of circulation pump 202 extends through the plurality of filter members 214, 216, 218. More particularly, for the embodiment depicted, shaft 210 extends through third filter panel 228 of third filter member 218, through second filter panel 224 of second filter member 216, and through first filter panel 220 of first filter member 214. Filter assembly 204 depicted in FIGS. 3 and 4 further includes discharge blades attached to shaft 210 adjacent to the respective filter panels 220, 224, 228. More particularly, exemplary filter assembly 204 depicted includes a first discharge blade 240, a second discharge blade 242, and a third discharge blade 244. First discharge blade 240 is attached to shaft 210 and positioned adjacent to first filter panel 220; second discharge blade 242 is attached to shaft 210 and is positioned adjacent to the second filter panel 224; and third discharge blade 244 is attached to shaft 210 and positioned adjacent to third filter panel 228.

Each of the discharge blades 240, 242, 244 may be attached to shaft 210 in any suitable manner. For example, in the embodiment depicted, shaft 210 defines a plurality of circumferential threads 246 and the first, second and third discharge blades 240, 242, 244 are each screwed onto circumferential threads 246 of shaft 210. Notably, shaft 210 includes a plurality of setpoints 248 attached to shaft 210 adjacent to each of the blades 240, 242, 244 to ensure each the blades 240, 242, 244 defines a desired gap 250 along the axial direction A with the respective filter panel 220, 224, 228. For example, the discharge blades may be configured such that the blades define a gap 250 of between about five thousandths of an inch and about fifty thousandths of an inch.

It should be appreciated, however, that in other exemplary embodiments, each of the blades 240, 242, 244 may instead be set in position using any other suitable mechanism and may define any other suitable gap 250 with the respective filter panel 220, 224, 228. For example, in other exemplary embodiments, filter assembly 204 may instead include a washer between each of the blades 240, 242, 244 and the respective filter panel 220, 224, 228. Additionally, in other embodiments, filter assembly 204 may define a gap 250 of between about ten thousandths of an inch and about thirty thousandths of an inch, or between about fifteen thousandths of an inch and about twenty thousandths of an inch. Moreover, each of the blades 240, 242, 244 may define different gaps 250 with first, second, and third panels 220, 224, 228, respectively. It should also be appreciated, that as used herein, terms of approximation, such as "approximately" and "about," refer to being within a ten percent margin of error.

Each of the exemplary blades 240, 242, 244 are configured to rotate in the circumferential direction C with shaft 210, and may serve the function of chopping particles greater than size of the respective filter openings 232, 234, 236. Further, as will be discussed below, blades 240, 242, 244 may also serve the functions of lifting particles off of the respective filter panels 220, 224, 228 and simultaneously moving particles outwardly along the radial direction R.

Figure 6:
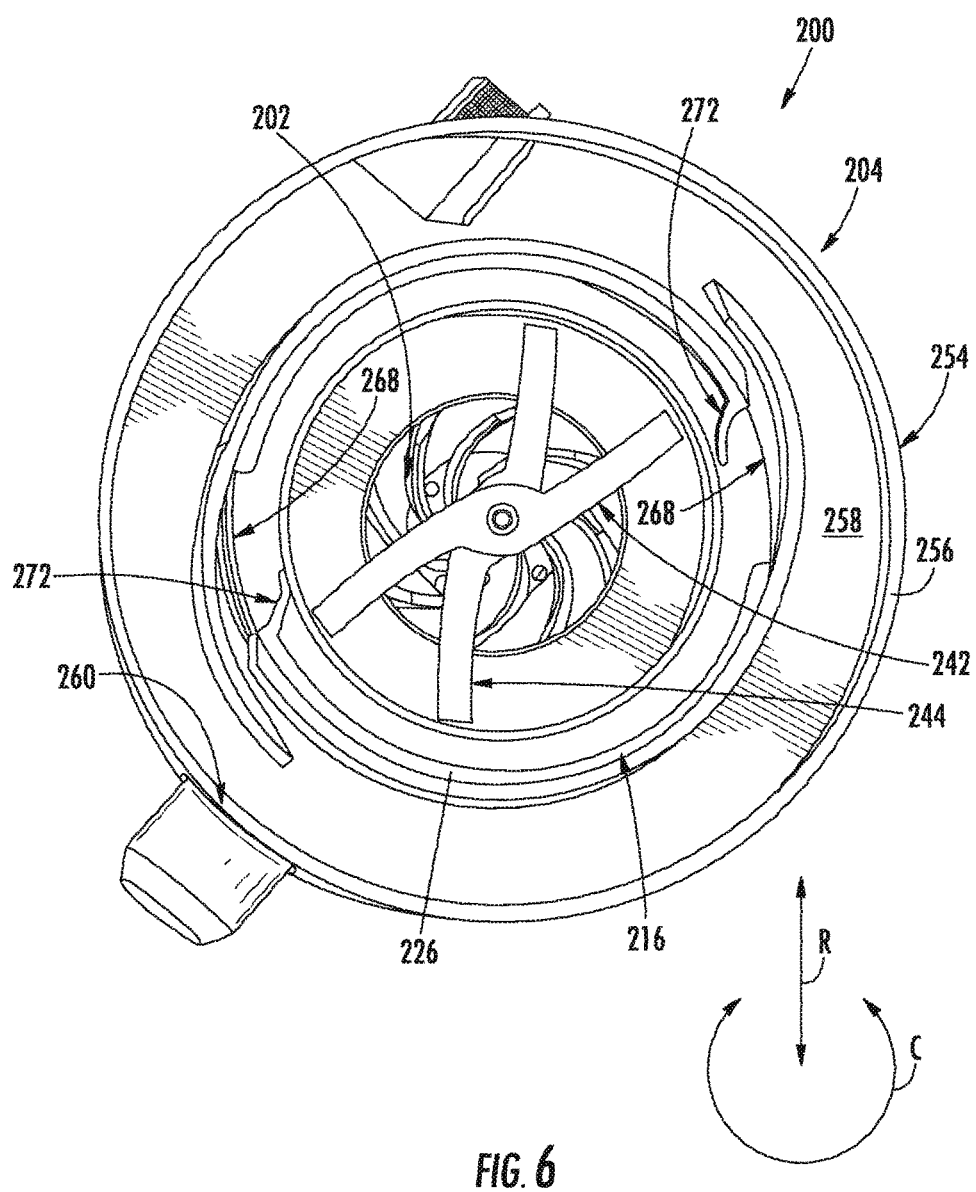
FIG. 6 provides a top, sectional view of a filter assembly in accordance with an exemplary embodiment of the present disclosure.

Referring particularly to FIG. 3 as well as to FIG. 6, sump 200 and filter assembly 204 thereof may include a housing 254 with a peripheral wall 256 extending around the one or more filter members. Peripheral wall 256 may thus circumferentially surround the filter members 214, 216, 218. More particularly, peripheral wall 256 extends around first, second, and third filter members 214, 216, 218, and defines a discharge chamber 258 with first, second, and third filter members 214, 216, 218. More particularly, peripheral wall 256 defines discharge chamber 258 with outer walls 222, 226, 230 of the respective filter assemblies 214, 216, 218. Discharge chamber 258 is thus defined between the peripheral wall 256 and the outer walls 222, 226, 230. Additionally, peripheral wall 256 defines an outlet 260. Outlet 260 is in fluid communication with a drain pump (not shown), such as drain pump 156 depicted in FIG. 2.

Filter members 214, 216, 218 attach to housing 254 below inlet 206 using a screw type connection. However, in other embodiments, the one or more filter members may attach to housing 254 in any other suitable manner, or alternatively at least one of the one or more filter members may be formed integrally with housing 254 of sump 200. In some embodiments, filter assembly 204 may include a transition member 262 attached to a filter member, or more particularly attached to third filter member 218. Transition member 262 makes a connection between the one or more filter members and impeller 208 of circulation pump 202. Accordingly, transition member 262 defines filter assembly outlet 264 whereby filtered wash fluid to be recirculated passes into circulation pump 202. Alternatively, one of the filter members, such as the third filter member 218, may connect directly to the impeller 208 and define the outlet 264.

Figure 5:
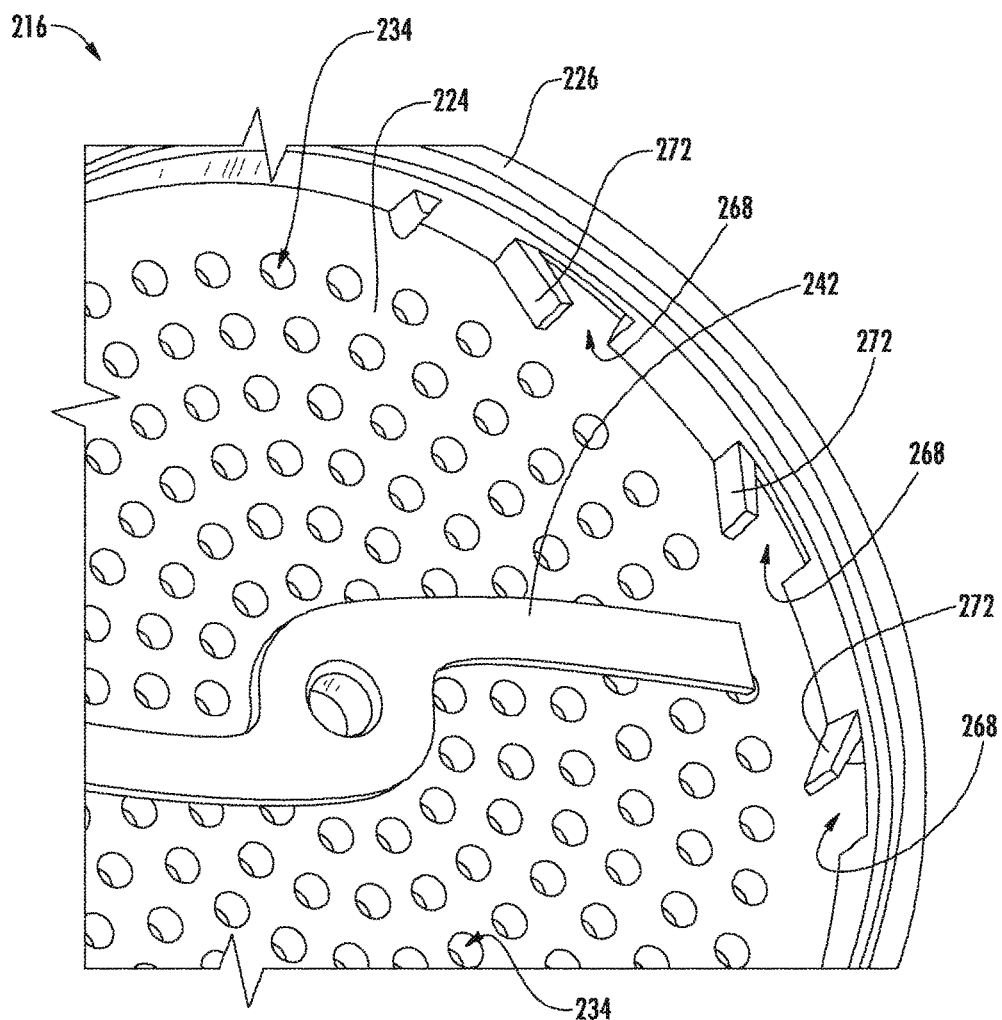
FIG. 5 provides a close up perspective view of a filter member of the exemplary filter assembly of FIG. 4.

Referring now also to FIG. 5, a close-up perspective view of second filter member 216 is provided. Outer walls 222, 226, 230 of each of the respective filter members 214, 216, 218 define one or more discharge openings that allow for soils to pass from a respective filter panel 220, 224, 228 to discharge chamber 258. For example, first outer wall 222 of first filter member 214 defines one or more first discharge openings 266; second outer wall 226 of the second filter member 216 defines one or more second discharge openings 268; and third outer wall 230 of third filter member 218 defines one or more third discharge openings 270. For the embodiment depicted, each filter member 214, 216, 218 further includes guide members 272 slanting inwardly along the radial direction R from the respective outer walls 222, 226, 230 adjacent to each of the respective discharge openings 266, 268, 270. More particularly, the guide members 272 slant towards the discharge openings 264, 266, 268 to guide particles through the discharge openings 264, 266, 268 into the discharge chamber 258. As may be more clearly seen in FIG. 5, the guide members 272 each define an angle with regard to the radial direction R. The angle of guide members 272 may be between about ninety degrees and about one hundred and eighty degrees, such as between about one hundred and five degrees and about one hundred and sixty-five degrees, such as between about one hundred and twenty degrees and about one hundred and fifty degrees, such as about one hundred and thirty-five degrees.

During operation of dishwasher appliance 100, or more particularly, during a wash or rinse cycle of dishwasher appliance 100, wash fluid may enter filter assembly 204 through inlet 206 and travel to first filter member 214. The wash fluid may be filtered by first filter panel 220 wherein soils larger than the first filter openings 232 are prevented from flowing therethrough to second filter member 216. At the same time wash fluid and soils smaller than first filter openings 232 may pass therethrough to second filter member 216. The wash fluid may then be filtered by second filter panel 224, wherein soils larger than second filter openings 234 are prevented from flowing therethrough to third filter member 218, while wash fluid and soils smaller than second filter openings 234 may pass therethrough to third filter member 218. The wash fluid may then be filtered by third filter panel 228, wherein soils larger than third filter openings 236 are prevented from flowing to circulation pump 202, while the wash fluid to be recirculated may pass therethrough to circulation pump 202 and be recirculated into tub 104 and wash chamber 106.

Moreover, during operation of the exemplary dishwasher appliance 100, or more particularly during a wash or rinse cycle of the exemplary dishwasher appliance 100, the motor of circulation pump 202 may rotate shaft 210, which in turn may rotate impeller 208 and each of first, second, and third discharge blades 240, 242, 244. The rotation of first, second, and third discharge blades 240, 242, 244 by shaft 210 may allow discharge blades 240, 242, 244 to chop soils greater than the respective first, second, and third filter openings 232, 234, 236 and/or move soils outward along the radial direction R through the respective discharge openings 266, 268, 270. For example, first discharge blade 240 may move soils larger than first filter openings 232 outward along the radial direction R through the one or more first discharge openings 266 and into the discharge chamber 258. Similarly, second discharge blade 242 may move soils larger than second filter openings 234 outward along the radial direction R through the one or more second discharge openings 268 and into discharge chamber 258. Further, third discharge blade 244 may move soils larger than third filter openings 236 outward along the radial direction R through the one or more third discharge openings 270 and into discharge chamber 258.

Referring now to FIG. 6, as illustrated, discharge chamber 258 in exemplary embodiments is a circumferentially continuous discharge chamber 258. In other words, the chamber 258 is continuous generally annularly and along the circumferential direction, such that wash fluid in the chamber 258 can freely rotate in a generally continuous flow path along the circumferential direction, such as annularly within chamber 258. Accordingly, particles that are removed from the filter members 214, 216, 218, such as from the panels 220, 224, 228 thereof, and traversed through the discharge openings 266, 268, 270 into the discharge chamber 258 may advantageously remain in the discharge chamber 258 until particles are drained from discharge chamber 258 via outlet 260.

As discussed, particles (and wash fluid) may flow through the discharge openings 266, 268, 270 into the circumferentially continuous discharge chamber 258. Further, as discussed, guide members 272 may guide particles through the discharge openings 264, 266, 268 into the discharge chamber 258. The guide members 272 and openings 264, 266, 268 of each filter member 214, 216, 218 may be spaced apart from each other along the circumferential direction, as illustrated. For example, in some exemplary embodiments, each filter member 214, 216, 218 may include two openings 264, 266, 268 and two associated guide members 272. The two openings 264, 266, 268 and two associated guide members 272 of each filter member 214, 216, 218 may, for example, be spaced between 170 and 190 degrees apart, such as between 175 and 185 degrees apart, such as approximately 180 degrees apart along the circumferential direction. Alternatively, one, three, four or more openings 264, 266, 268 and associated guide members 272 may be utilized. Further, the openings 264, 266, 268 and associated guide members 272 may have any suitable spacing along the circumferential direction.

The filtered soils along with some accompanying wash fluid may be stored in discharge chamber 258 until wash cycle is complete and a discharge cycle is activated. During a discharge cycle, the drain pump is activated and wash fluid is pulled through, e.g., discharge chamber 258 and outlet 260 into and through a drain pipe (not shown). The drain pipe may be fluidly connected with a drain or other plumbing configured to dispose of such wash fluid and filtered particles. Notably, in certain embodiments, an appropriate amount of continuous flow of wash fluid, generated by the respective blades 240, 242, 244, may flow with filtered soils into discharge chamber 258 and through outlet 260 during a wash and/or rinse cycle of dishwasher appliance 100. In such an embodiment, a length of the drain pipe of the exemplary dishwasher appliance 100 may be filled with filtered/discharged soils and wash fluid (i.e., wash fluid that will not be recirculated). Such a configuration may accommodate storage of the filtered/discharged soils and accompanying wash fluid during a wash and/or rinse cycle of the exemplary dishwasher appliance 100. Additionally, in certain embodiments, the drain pump 156 may be activated for a relatively short period of time during, e.g., a wash or rinse cycle, in order to provide drainage of the wash fluid and filtered/discharged soils prior to a drain cycle.

FIGS. 7-10 provide a front view (FIG. 7), a bottom view (FIG. 8), a top view (FIG. 9), and a perspective view (FIG. 10) of a discharge blade 300 in accordance with exemplary embodiments of the present disclosure. The discharge blade 300 defines a vertical direction, a lateral direction L and a transverse direction T. The vertical, lateral and transverse directions are mutually perpendicular and form an orthogonal direction system. As will be discussed below in more detail, the discharge blade 300 may be configured as one or more of the discharge blades 240, 242, 244 shown above in FIGS. 4-6.

Figure 7:
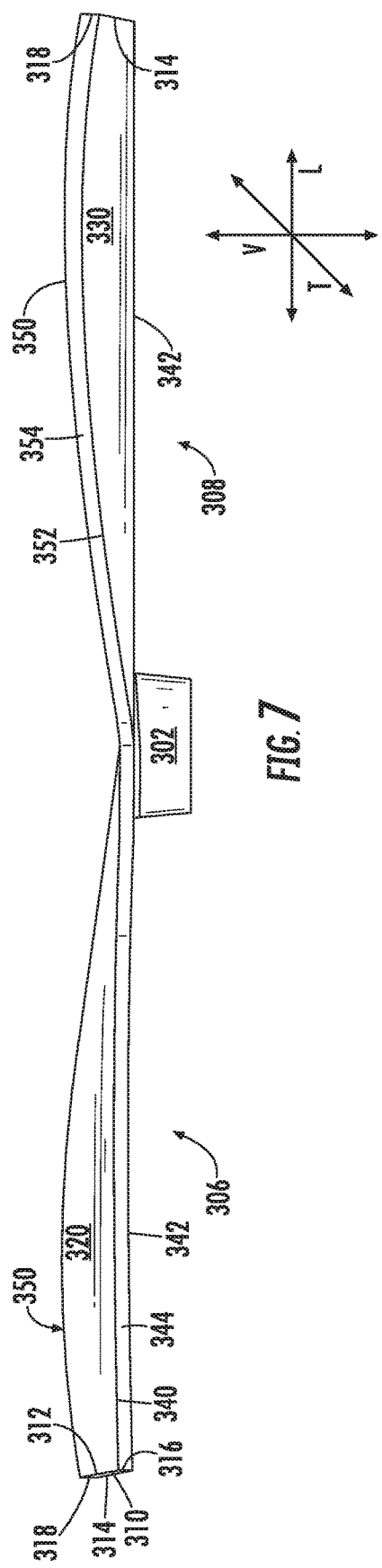
FIG. 7 provides a front view of a discharge blade in accordance with an exemplary embodiment of the present disclosure.
Figure 8:
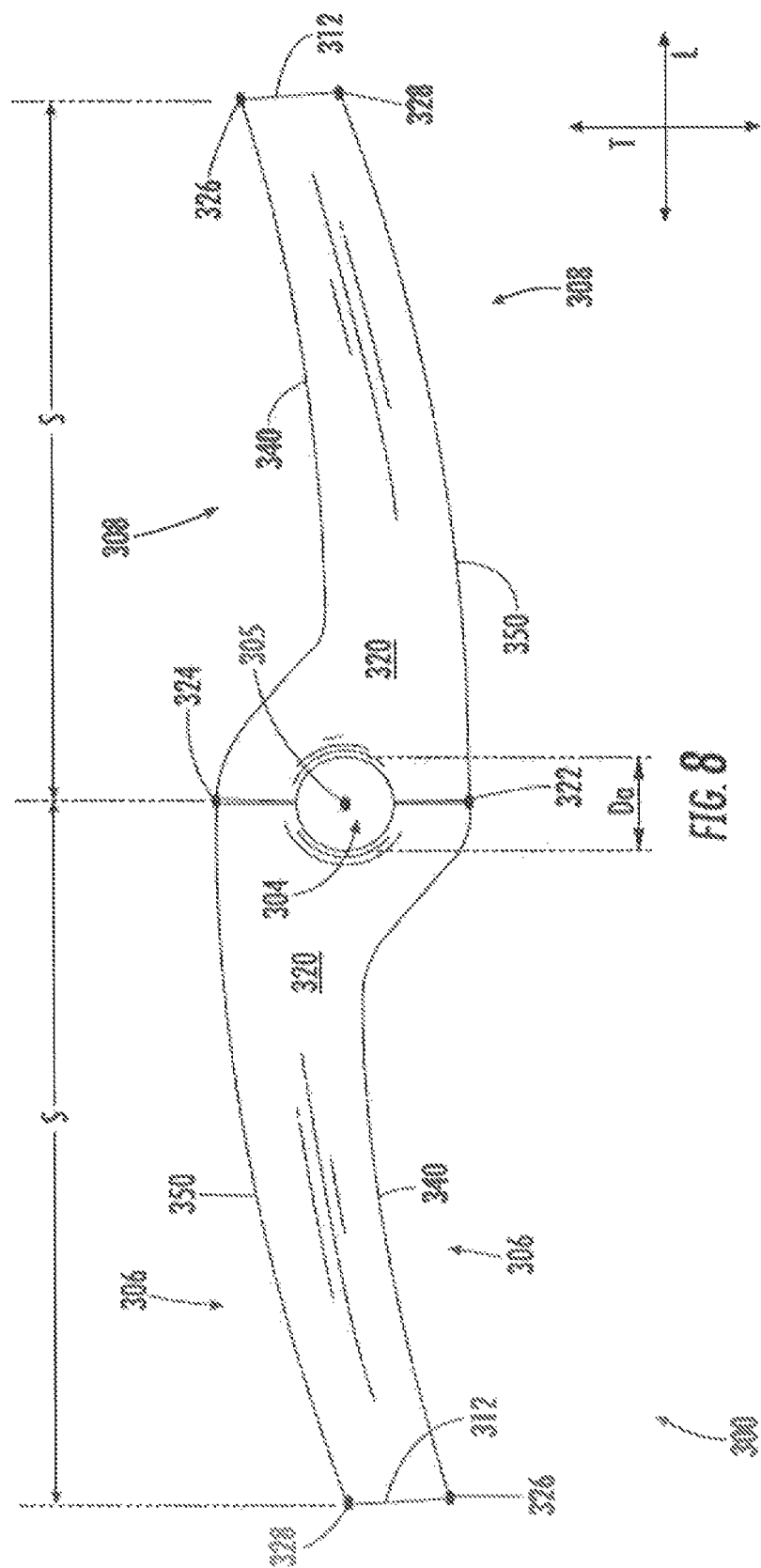
FIG. 8 provides a top view of an exemplary discharge blade in accordance with the present disclosure.

As shown in FIGS. 7 and 8, the discharge blade 300 includes a blade hub 302. The blade hub 302 defines an aperture 304 having a diameter $D_A$ and a center point 305. It should be appreciated that, in an exemplary embodiment, the diameter $D_A$ of the aperture 304 is greater than a diameter of the shaft 210 (see FIG. 4). Moreover, in such embodiments, the shaft 210 extends through the aperture 304, and the discharge blade 300 may rotate about the axial direction A. However, it should also be appreciated that, in other embodiments, the diameter $D_A$ is equal to a diameter of the shaft 210.

The discharge blade 300 further includes a first opposing blade 306 and a second opposing blade 308. As shown, the first and second opposing blades 306, 308 each include a blade tip 310. Further, both the first and second opposing blade 306, 308 extend outward from the blade hub 302 to the blade tip 310 along the lateral direction L. The blade tip 310 includes a top edge 312, a bottom edge 314, and opposing sides 316, 318. The top and bottom edges 312, 314 are spaced apart along the vertical direction V. Opposing sides 316, 318 are spaced apart along the transverse direction T. Accordingly, the blade tip 310 extends between the top and bottom edges 312, 314 along the vertical direction V, and opposing sides 316, 318 along the transverse direction T.

Figure 9:
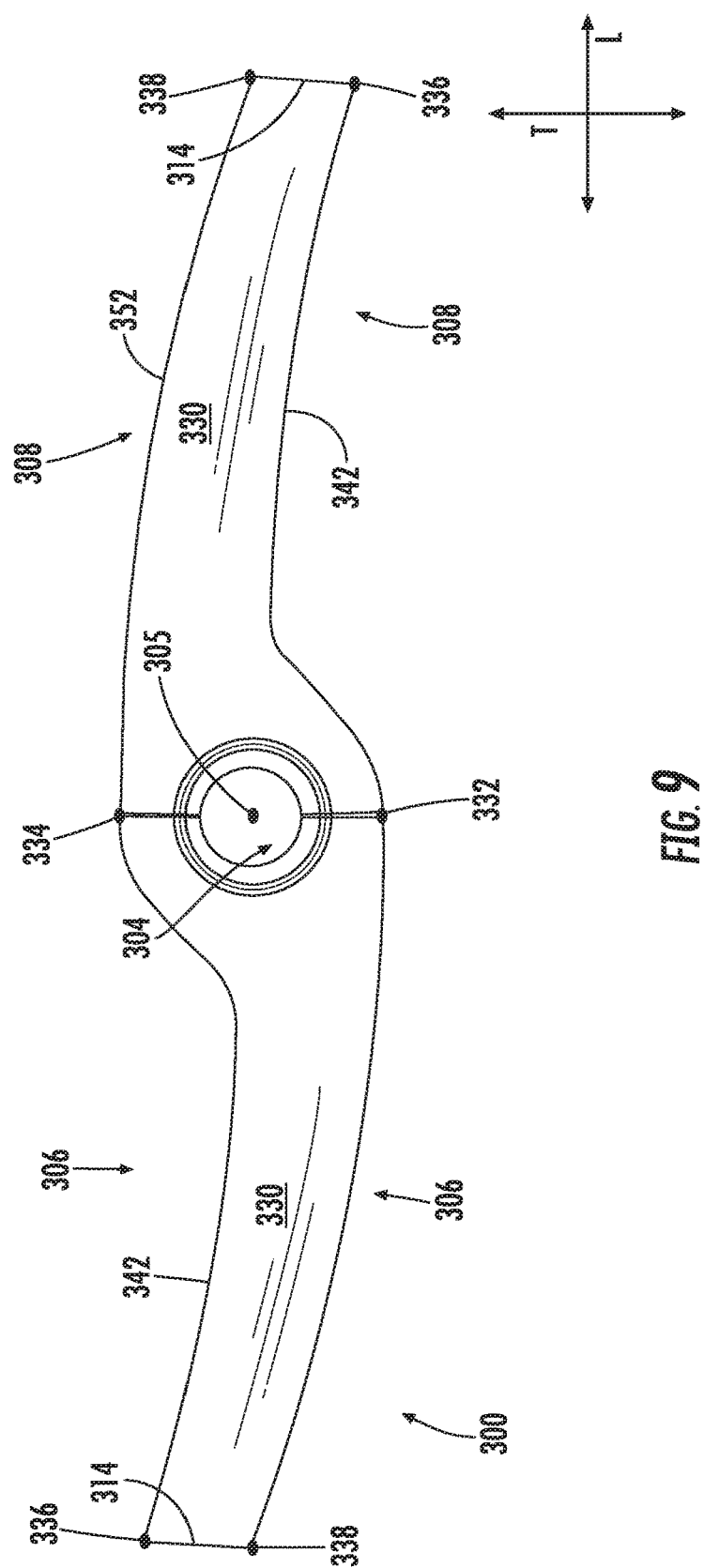
FIG. 9 provides a bottom view of an exemplary discharge blade in accordance with the present disclosure.
Figure 10:
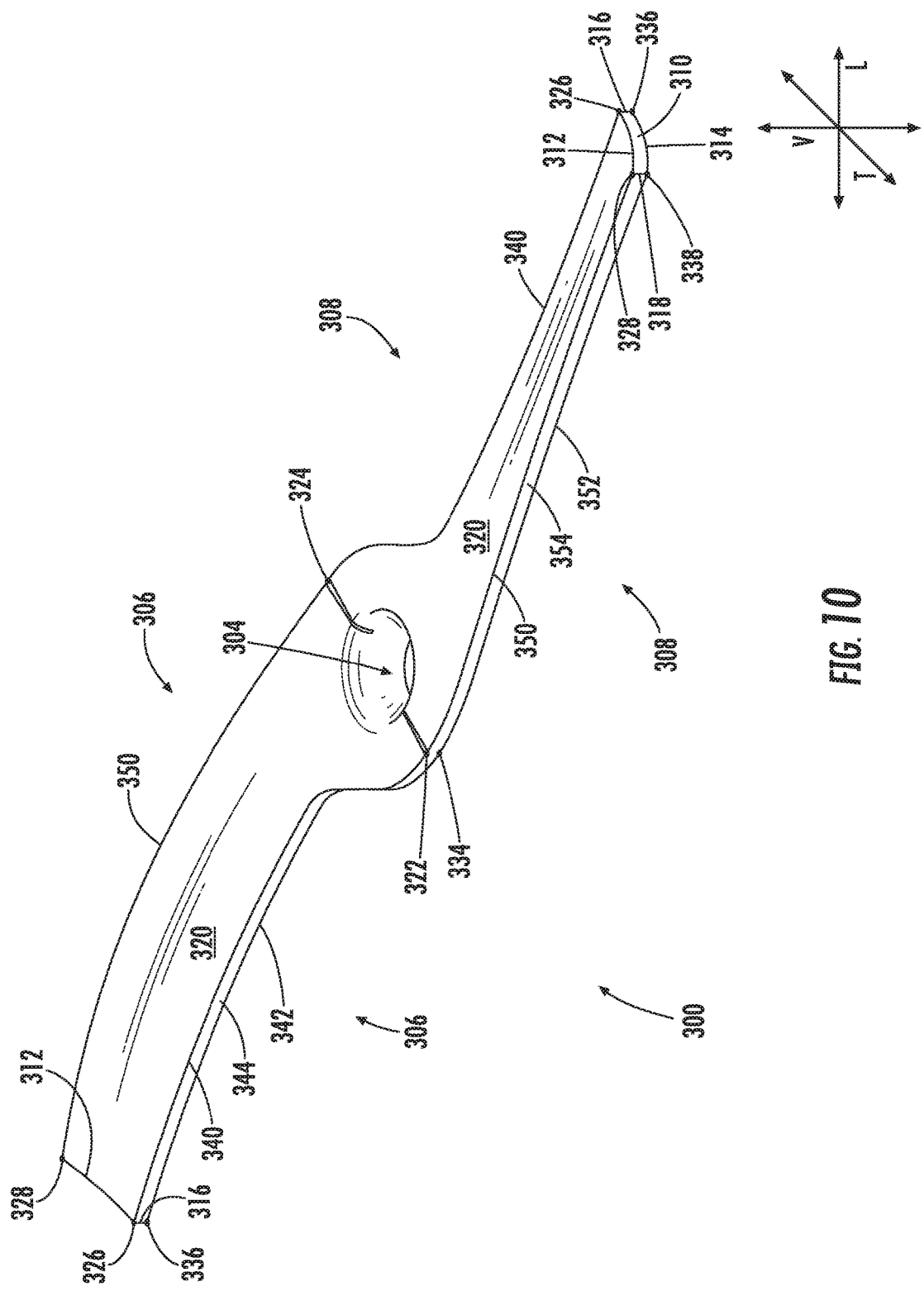
FIG. 10 provides a perspective view of an exemplary discharge blade in accordance with the present disclosure.

Referring now to FIGS. 8-10, each of the first and second opposing blades 306, 308 further include a top surface 320 and a bottom surface 330. The top surface 320 includes a first endpoint 322, a second endpoint 324, a third endpoint 326, and a fourth endpoint 328 which define peripheral corners of the top surface 320. The bottom surface 330 includes a first endpoint 332, a second endpoint 334, a third endpoint 336 and a fourth endpoint 338 which define peripheral corners of the bottom surface 330. In some exemplary embodiments, the top surface 320 is spaced apart from the bottom surface 330 along the vertical direction V. More specifically, the top surface 320 is positioned above the bottom surface 330 along the vertical direction V. Accordingly, in such embodiments, the endpoints 322, 324, 326, 328 of the top surface 320 are spaced apart from the endpoints 332, 334, 336, 338 of the bottom surface 330 along the vertical direction V.

As shown in FIG. 8, the first and second endpoints 322, 324 of the top surface 320 are spaced apart along the transverse direction T. More specifically, the center point 305 of the aperture 304 is positioned between the first and second endpoints 322, 324 along the transverse direction T. In some exemplary embodiments, the center point 305 of the aperture 304 is aligned with the first and second endpoints 322, 324 along the transverse direction T. The third and fourth endpoints 326, 328 of the top surface 320 are spaced apart from both the first and second endpoints 322, 324 along the lateral direction L. Further, the third and fourth endpoints 326, 328 are spaced apart from each other along the transverse direction T.

The top surface 320 further includes a front edge 340 and a back edge 350. The back edge 350 is spaced apart from the front edge 340 along the transverse direction T. For the first opposing blade 306, the front edge 340 extends between the first and third endpoints 322, 326 along the lateral direction L; the back edge 350 extends between the second and fourth endpoints 324, 328 along the lateral direction L; and the top edge 312 of the blade tip 310 extends between the third and fourth endpoints 326, 328 along the transverse direction T. Accordingly, the top surface 320 extends between the front and back edges 340, 350 along the transverse direction T. Further, the top surface 320 extends between the blade hub 302 and the top edge 312 of the blade tip 310 along the lateral direction L.

For the second opposing blade 308, the front edge 340 extends between the second and third endpoints 324, 326 along the lateral direction; the back edge 350 extends between the first and fourth endpoints 322, 328 along the lateral direction L; and the top edge 312 of the blade tip 310 extends between the third and fourth endpoints 326, 328 along the transverse direction T. Accordingly, the top surface 320 extends between the front and back edges 340, 350 along the transverse direction T. Further, the top surface 320 extends between the blade hub 302 and the top edge 312 of the blade tip 310 along the lateral direction L.

It should be appreciated that both the first and second opposing blades 306, 308 define a span S between the center point 305 and the blade tip 310 along the lateral direction L. Further, in some exemplary embodiments, the span S of the first opposing blade 306 may be different from the span S of the second opposing blade 308. For example, in one embodiment, the span S of the first opposing blade 306 may be greater than the span S of the second opposing blade 308. In another embodiment, the span S of the first opposing blade 306 may be less than the span S of the second opposing blade 308. Alternatively, in yet another embodiment, the span S of the first opposing blade 306 may be equal to the span S of the second opposing blade 308.

As shown in FIG. 9, the first and second endpoints 332, 334 of the bottom surface 330 are spaced apart along the transverse direction T. More specifically, the center point 305 of aperture 304 is positioned between the first and second endpoints 332, 334 along the transverse direction T. In exemplary embodiments, the center point 305 of aperture 304 is aligned with the first and second endpoints 332, 334 along the transverse direction T. The third and fourth endpoints 336, 338 of the bottom surface 330 are spaced apart from both the first and second endpoints 332, 334 along the lateral direction L. Further, the third and fourth endpoints 336, 338 are spaced apart from each other along the transverse direction T.

The bottom surface 330 of the first and second opposing blades 306, 308 further includes a front edge 342 and a back edge 352. For the first opposing blade 306, the front edge 342 extends between the first and third endpoints 332, 336 along the lateral direction L; the back edge 352 extends between the second and fourth endpoints 334, 338 along the lateral direction L; and the bottom edge 314 of the blade tip 310 extends between the third and fourth endpoints 336, 338 along the transverse direction T. Accordingly, the bottom surface 330 extends between the front and back edges 342, 352 along the transverse direction T. Further, the bottom surface 330 extends between the blade hub 302 and the bottom edge 314 of the blade tip 310 along the lateral direction L.

For the second opposing blade 308, the front edge 342 extends between the second and third endpoints 334, 336 along the lateral direction L; the back edge 352 extends between the first and fourth endpoints 332, 338 along the lateral direction L; and the bottom edge 314 of the blade tip 310 extends between the third and fourth endpoints 334, 336 along the transverse direction T. Accordingly, the bottom surface 330 extends between the front and back edges 342, 352 along the transverse direction T. Further, the bottom surface 330 extends between the blade hub 302 and the bottom edge 314 of the blade tip 310 along the lateral direction L.

Referring now to FIG. 10, both the first and second opposing blade 306, 308 further includes a leading edge 344 and a trailing edge 354. The leading edge 344 extends between front edges 340, 342 along the vertical direction V. In exemplary embodiments, the leading edge 344 defines a substantially flat surface between the blade hub 302 and the blade tip 310. The trailing edge 354 extends between back edges 350, 352 along the vertical direction V. As will be discussed below in more detail, the trailing edge 354 defines a curve between the blade hub 302 and the blade tip 310.

Figure 11:
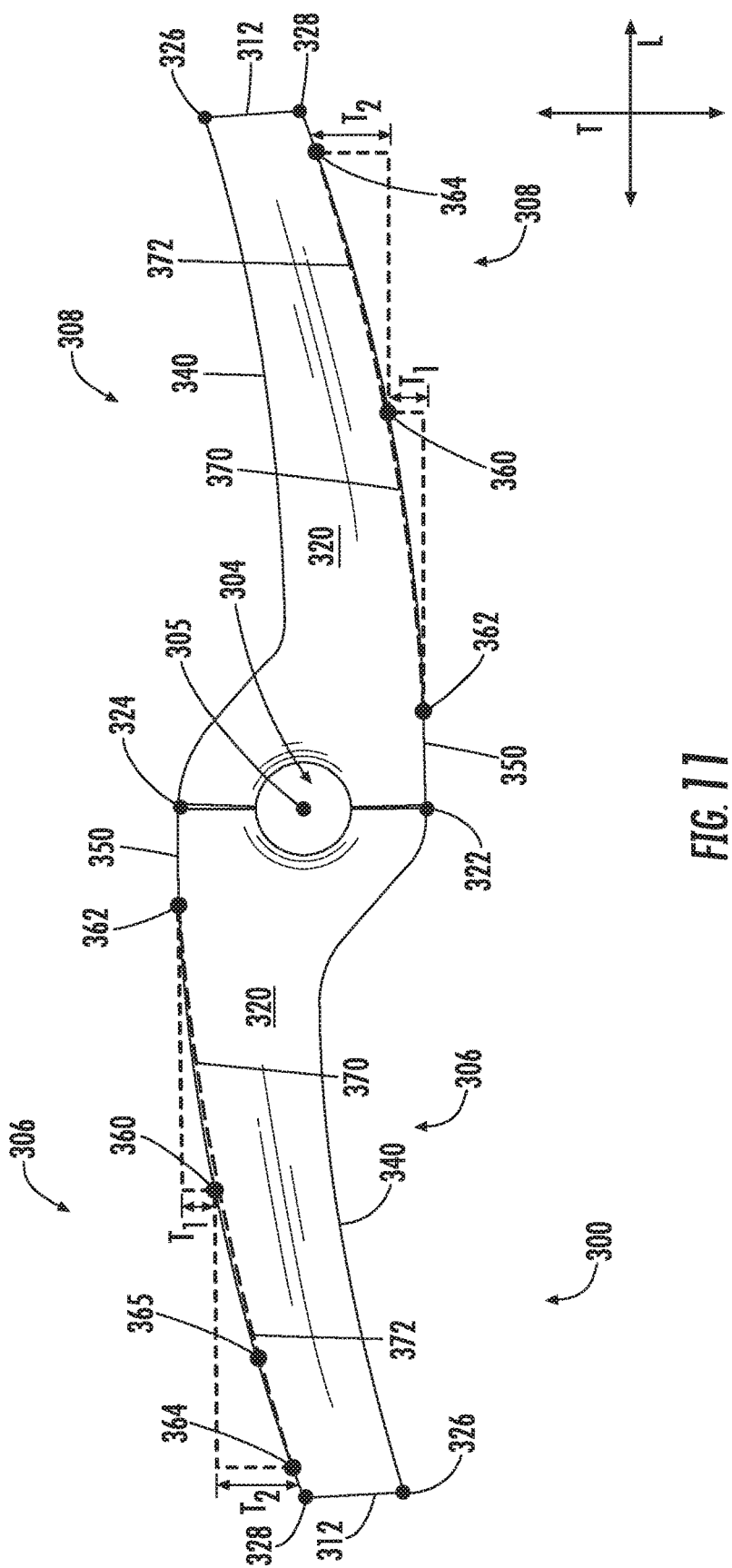
FIG. 11 provides a top view of an exemplary discharge blade in accordance with the present disclosure.

FIG. 11 provides a top view of the discharge blade 300. More specifically, a first point 360, a second point 362, and a third point 364 are defined on the back edge 350 of both the first and second opposing blade 306, 308. For the back edge 350 of the first opposing blade 306, the first point 360 is positioned between the second endpoint 324 and the fourth endpoint 328 along the lateral direction L. Further, in an exemplary embodiment, the first point 360 is a midpoint of the back edge 350, wherein the midpoint is positioned halfway between the second and fourth endpoints 324, 328 of the back edge 350.

As shown, the first point 360 is positioned above the front edge 340 along the vertical direction V. In one embodiment, the first point 360 is between approximately 0.035 inches and approximately 0.075 inches above the front edge 340 along the vertical direction V. In another embodiment, the first point 360 is between approximately 0.050 inches and approximately 0.075 inches above the front edge 340 along the vertical direction V. In yet another embodiment, the first point 360 is approximately 0.055 inches above the front edge 340 along the vertical direction V.

The second point 362 is defined between the second endpoint 324 and the first point 360 along the lateral direction L. As shown, a first slope 370 is defined between the first and second points 360, 362 along the lateral direction L. The third point 364 is positioned between the first point 360 and the fourth endpoint 328 along the lateral direction L. Further, a second slope 372 is defined between the first and third points 360, 364 along the lateral direction L. As shown, a first displacement $T_1$ defined between the first and second points 360, 362 along the transverse direction T is different than a second displacement $T_2$ defined between the first and third points 360, 364 along the transverse direction T. More specifically, in exemplary embodiments, the second displacement $T_2$ is greater than the first displacement $T_1$. Accordingly, in such exemplary embodiments, the second slope 372 is greater than the first slope 370, and the back edge 350 of the top surface 320 defines a curve between the blade hub 302 and the blade tip 310 along the lateral direction L. More specifically, the back edge 350 of the first opposing blade 306 defines a curve between the second endpoint 324 and the fourth endpoint 328 along the lateral direction L.

As shown in FIG. 11, an apex 365 is positioned on the back edge 350 of the first and second opposing blades 306, 308. More specifically, the apex 365 is positioned between the first point 360 and the third point 364 along the transverse direction T. Further, the apex 365 is positioned above the front edge 340 along the vertical direction V. More specifically, in one embodiment, the apex 365 is between approximately 0.036 inches and approximately 0.076 inches above the front edge 340 along the vertical direction V. In another embodiment, the apex 365 is between approximately 0.050 inches and approximately 0.070 inches above the front edge 340 along the vertical direction V. In yet another embodiment, the apex 365 is approximately 0.056 inches above the front edge 340 along the vertical direction V.

Still referring to FIG. 11, for the back edge 350 of the second opposing blade 308, the first point 360 is positioned between the first endpoint 322 and the fourth endpoint 328 along the lateral direction L. Further, in exemplary embodiments, the first point 360 is a midpoint of the back edge 350, wherein the midpoint is positioned halfway between the first endpoint 322 and the fourth endpoint 328. The second point 362 is positioned between the second endpoint 324 and the first point 360 along the lateral direction L. As shown, a first slope 370 is defined between the first and second points 360, 362. The third point 364 is positioned between the first point 360 and the fourth endpoint 328 along the lateral direction L. Further, a second slope 372 is defined between the first and third points 360, 364. As shown, a first displacement $T_1$ defined between the first and second points 360, 364 along the transverse direction T is different than a second displacement $T_2$ defined between the first and third points 360, 364 along the transverse direction T. More specifically, the second displacement $T_2$ is greater than first displacement $T_1$. Accordingly, the second slope 372 is greater than the first slope 370, and the front edge 330 of the second opposing blade 308 defines a curve between the blade hub 302 and the blade tip 310. More specifically, the back edge 350 of the second opposing blade 308 defines a curve between the first endpoint 322 and the fourth endpoint 328 along the lateral direction L.

It should be appreciated that, in some embodiments, the first and second slopes 370, 372 of the first opposing blade 306 may be different than the first and second slopes 370, 372 of the second opposing blade 308. As an example, the second slope 372 of the first opposing blade 306 may, in some exemplary embodiments, be greater than the second slope 372 of the second opposing blade 308. Alternatively, in other exemplary embodiments, the second slope 372 of opposing blade 306 may be less than the second slope 372 of the second opposing blade 308. In yet other embodiments, the second slope 372 of the first opposing blade 306 may be equal to the second slope 372 of the second opposing blade 308.

Figure 12:
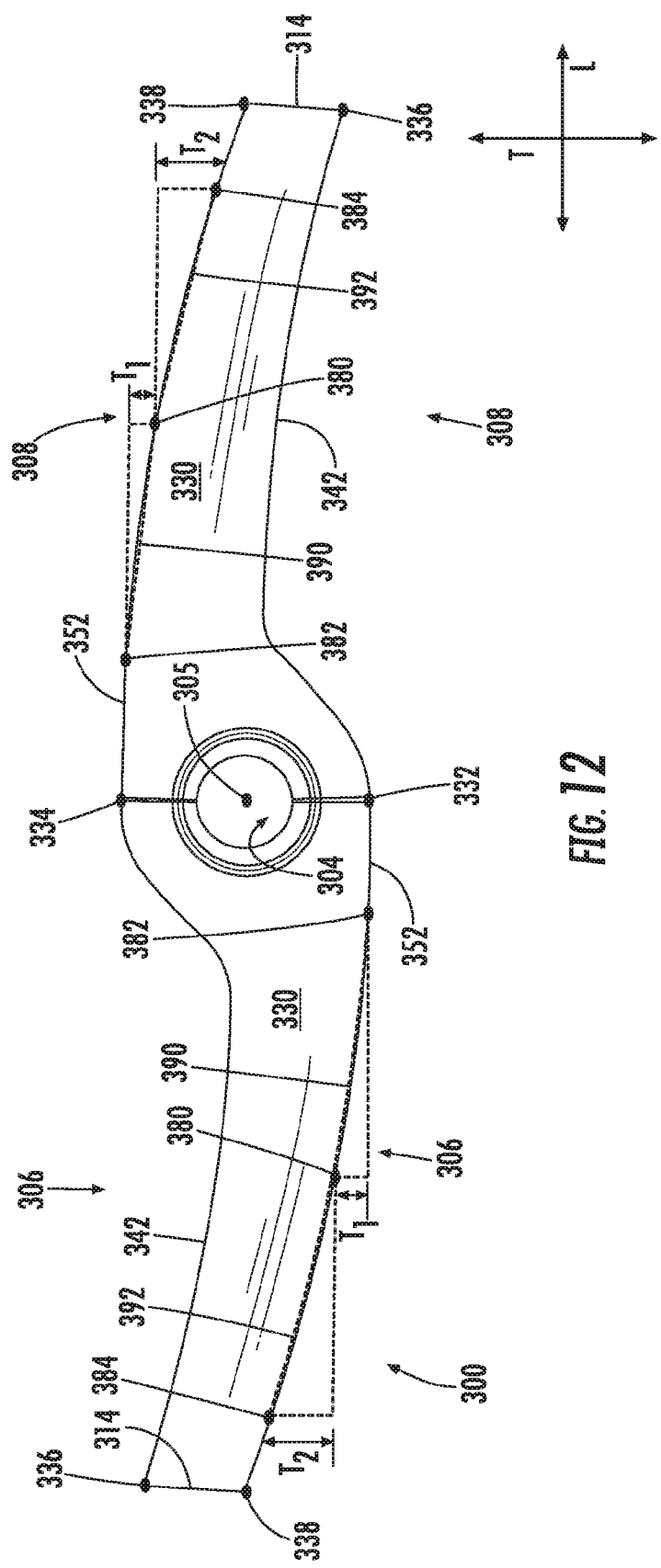
FIG. 12 provides a bottom view of an exemplary discharge blade in accordance with the present disclosure.

FIG. 12 provides a bottom view of the discharge blade 300. More specifically, a first point 380, a second point 382, and a third point 384 are defined on the back edge 352 of both the first and second opposing blade 306, 308. For the back edge 352 of the first opposing blade 306, the first point 380 is positioned between the first and fourth endpoint 332, 338 of the back edge 352. Further, in exemplary embodiments, the first point 380 is a midpoint of the back edge 352, wherein the midpoint is positioned halfway between the first and fourth endpoints 332, 338. The second point 382 is positioned between the first endpoint 332 and the first point 380 along the lateral direction L. Further, a first slope 390 is defined between the first and second points 380, 382 along the lateral direction L. The third point 384 is positioned between the first point 380 and the fourth endpoint 338 along the lateral direction L, and a second slope 392 is defined between the first and third points 380, 384. As shown, a first displacement $T_1$ defined between the first and second points 380, 382 along the transverse direction T is different than a second displacement $T_2$ defined between the first and third points 380, 384 along the transverse direction T. More specifically, the second displacement $T_2$ is greater than first displacement $T_1$. Accordingly, the second slope 392 is greater than the first slope 390, and the back edge 352 of the first opposing blade 306 defines a curve between the blade hub 302 and the blade tip 310 along the lateral direction L. More specifically, the back edge 352 of the first opposing blade 306 defines a curve between the first and fourth endpoints 332, 338 along the lateral direction L.

For the back edge 352 of the second opposing blade 308, the first point 380 is positioned between the second endpoint 334 and the fourth endpoint 338 along the lateral direction L. Further, in exemplary embodiments, the first point 380 is a midpoint of the back edge 352, wherein the midpoint is positioned halfway between the second endpoint 334 and the fourth endpoint 338. The second point 382 is positioned between the second endpoint 334 and the first point 380 along the lateral direction L. Further, a first slope 390 is defined between the first and second points 380, 382. The third point 384 is positioned between the first point 380 and the fourth endpoint 338 along the lateral direction L, and a second slope 392 is defined between the first and third points 380, 384. As shown, a first displacement $T_1$ defined between the first and second points 380, 382 along the transverse direction T is different than a second displacement $T_2$ defined between the first and third points 380, 384 along the transverse direction T. More specifically, the second displacement $T_2$ is greater than first displacement $T_1$. Accordingly, the second slope 392 is greater than the first slope 390, and the back edge 352 of opposing blade 308 defines a curve between the blade hub 302 and the blade tip 310. More specifically, the back edge 350 of the second opposing blade 308 defines a curve between the second endpoint 334 and the fourth endpoint 338 along the lateral direction L.

It should be appreciated that, in some embodiments, the first and second slopes 390, 392 of the first opposing blade 306 may be different than the first and second slopes 390, 392 of the second opposing blade 308. As an example, the second slope 392 of the first opposing blade 306 may, in some exemplary embodiments, be greater than the second slope 392 of the second opposing blade 308. Alternatively, in other exemplary embodiments, the second slope 392 of the first opposing blade 306 may be less than the second slope 392 of the second opposing blade 308. Further, it should be appreciated that the back edge 350 of the top surface 320 may define a curve that is different from a curve defined by the back edge 352 of the bottom surface 330. More specifically, the first and second slopes 370, 372 defined by the back edge 350 of the top surface 320 may be different than the first and second slopes 30, 392 defined by the back edge 352 of the bottom surface 330.

Figure 13:
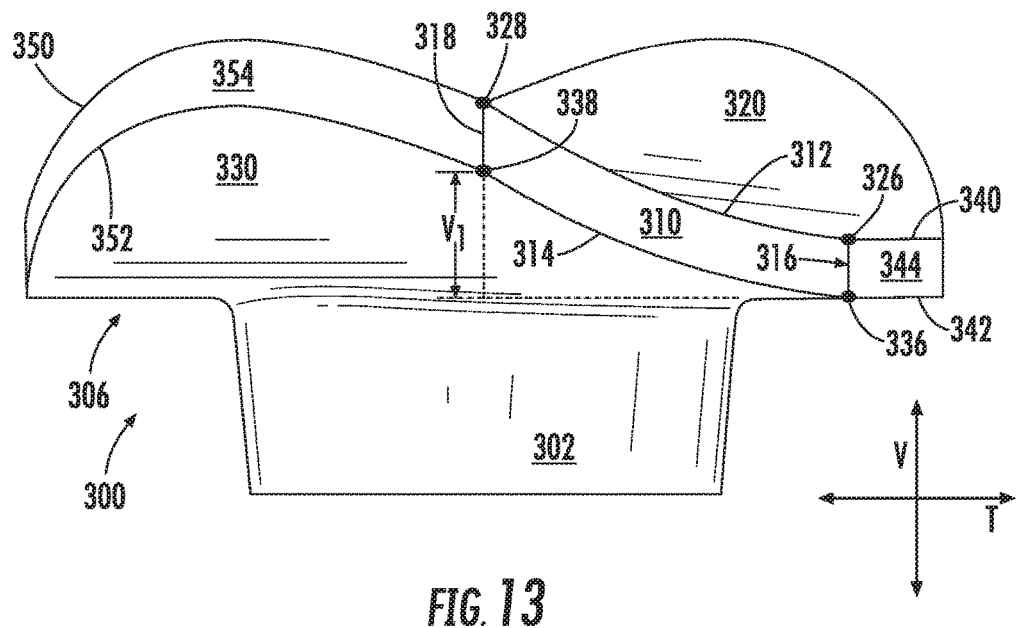
FIG. 13 provides a side elevation view of an exemplary discharge blade in accordance with the present disclosure.
Figure 14:
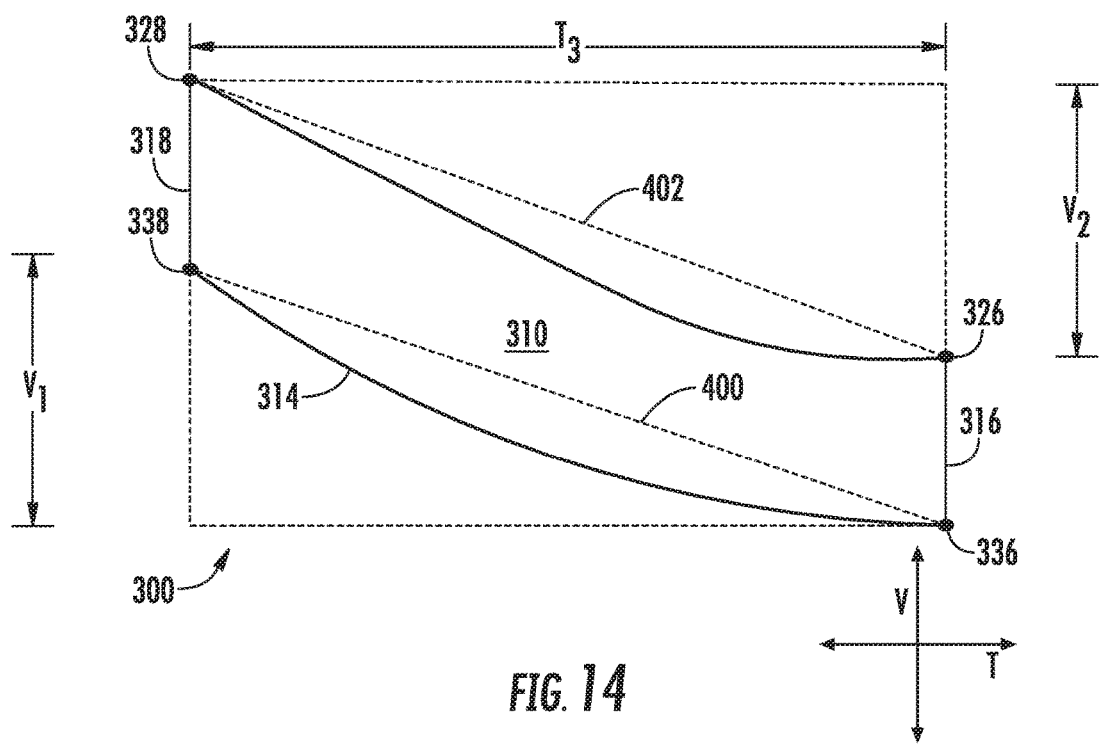
FIG. 14 provides an end view of the exemplary discharge blade in accordance with the present disclosure.

FIGS. 13 and 14 provide a side elevation view (FIG. 13) of the discharge blade 300 and an end view (FIG. 14) of the discharge blade 300. As shown, the trailing edge 354 extends between back edges 350, 352 along the vertical direction V and defines a curved surface. Further, the trailing edge 354 is spaced apart from the leading edge 344 along both the transverse and vertical directions. As shown, the third and fourth endpoints 336, 338 of the bottom surface 330 are spaced apart along the vertical direction V. More specifically, the fourth endpoint 338 is positioned above the third endpoint 336 by a first distance $V_1$. Accordingly, the bottom surface 330 of the first and second opposing blades 306, 308 defines a slope 400 between the front edge 342 and the back edge 352. It should be appreciated that the slope 400 depends, at least in part, upon the first distance $V_1$ between the third and fourth endpoints 336, 338. For example, in one exemplary embodiment, the distance $V_1$ may be between approximately 0.045 inches and approximately 0.1 inches. In another exemplary embodiment, the distance $V_1$ may be between approximately 0.055 inches and approximately 0.90 inches. In yet another embodiment, the third distance $V_1$ may be approximately 0.06 inches.

Further, as shown in FIG. 14, the fourth endpoint 328 is positioned above the third endpoint 326 by a second distance $V_2$. Accordingly, the top surface 320 of the first and second opposing blades 306, 308 defines a slope 402 between the front edge 340 and the back edge 350. It should be appreciated that the slope 402 depends, at least in part, upon the distance $V_2$ between the third and fourth endpoints 326, 328. For example, in one exemplary embodiment, the second distance $V_2$ may be between approximately 0.055 inches and approximately 0.11 inches. In another exemplary embodiment, the distance $V_2$ may be between approximately 0.060 inches and approximately 0.090 inches. In yet another embodiment, the second distance $V_2$ may be approximately 0.07 inches.

It should also be appreciated that the slope 402 of the top surface 320 may be different than the slope 400 of the bottom surface 330. As an example, the slope 402 of the top surface 320 may be greater than the slope 400 of the bottom surface 330. In another embodiment, the slope 402 of the top surface 320 may be less than the slope 400 of the bottom surface 330. Alternatively, in yet another embodiment, the slope 402 of the top surface 320 may be equal to the slope 400 of the bottom surface 330.

Figure 15:
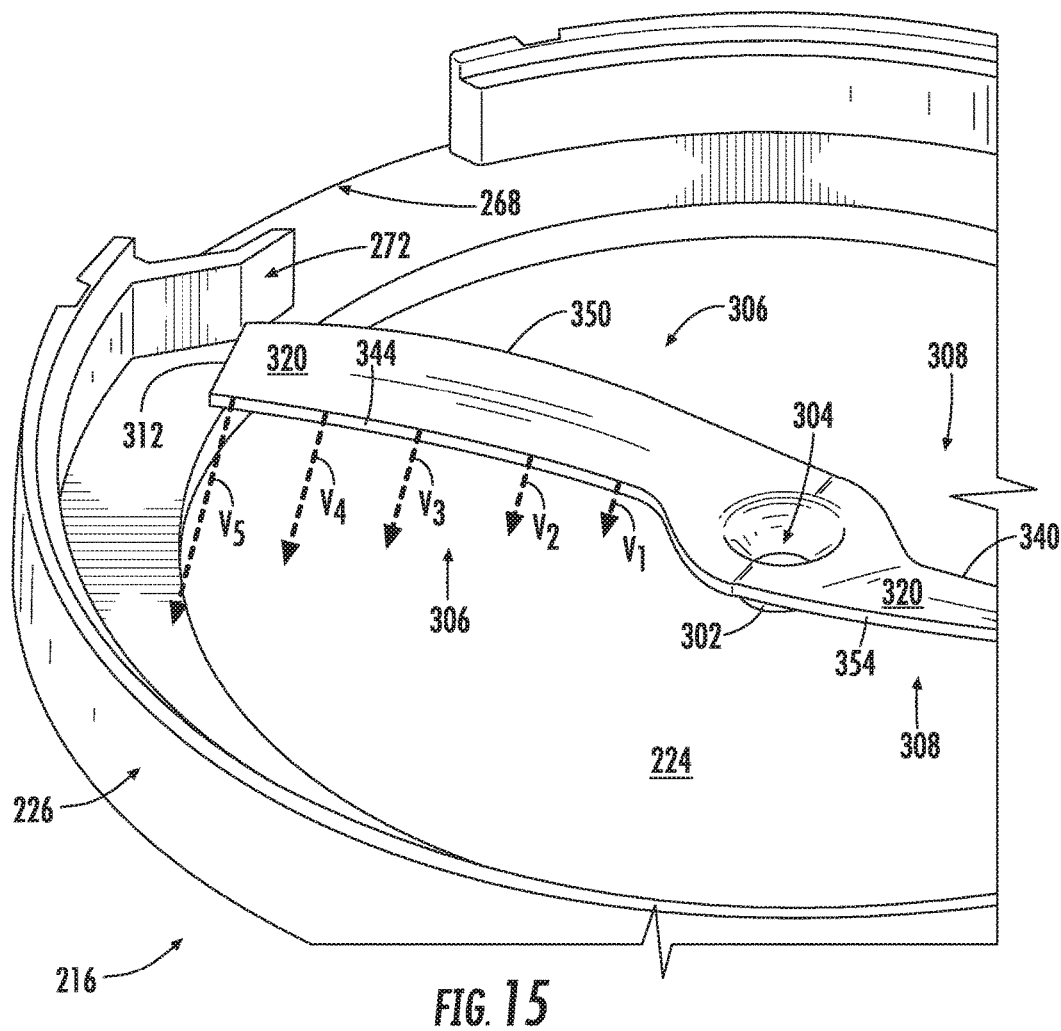
FIG. 15 provides a close up perspective view of an exemplary discharge blade within an exemplary filter assembly in accordance with the present disclosure.

FIG. 15 provides a perspective view of the discharge blade 300 disposed within the second filter member 216. More specifically, velocity vectors $V_1$, $V_2$, $V_3$, $V_4$, and $V_5$ are shown spaced apart from each other along the span S of opposing blade 306. Further, due to the slope 402 of the top surface 320, the magnitude (generally indicated by length of arrows) of velocity vectors $V_1$-$V_5$ are different from one another. In particular, for the embodiment depicted in FIG. 15, the magnitude of $V_1 < V_2 < V_3 < V_4 < V_5$ along the span S of opposing blade 306. Accordingly, the discharge blade 300, specifically the first opposing blade 306, may lift particles off of the filter panel 224 along the axial direction A and simultaneously expel said particles radially outward towards the discharge opening 268.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:
1. A filter assembly for filtering a wash fluid to be circulated by a circulation pump in a dishwasher appliance, the filter assembly defining an axial direction, a radial direction, and a circumferential direction, the axial direction extending between a top portion of the dishwasher appliance and a bottom portion of the dishwasher appliance, the filter assembly comprising:
   a filter member including a filter panel, the filter panel defining a plurality of filter openings, the filter member defining a discharge opening;
   a circumferential discharge chamber disposed radially outward of the filter member, the discharge chamber in fluid communication with the filter member through the discharge opening; and
   a discharge blade attached to a shaft that extends through the filter member and is rotatable about the axial direction, the discharge blade positioned adjacent to the filter panel, the discharge blade defining a lateral direction, a transverse direction and a vertical direction, the discharge blade comprising:
      a blade hub defining an aperture, the shaft extending through the aperture such that the discharge blade is attached to the shaft and can rotate about the axial direction; and
      a pair of opposing blades extending outward from the blade hub to a blade tip along the lateral direction, at least one of the opposing blades comprising:

a leading edge defined between the blade hub and the blade tip along the lateral direction;

a trailing edge spaced apart from the leading edge along both the transverse and vertical direction, the trailing edge defining a curve that extends between the blade hub and the blade tip along the lateral direction; and a top surface spaced apart from a bottom surface along the vertical direction, the top surface defining a slope between the leading edge and the trailing edge along the transverse direction, wherein the trailing edge is positioned above the leading edge along the vertical direction such that both the top surface and the bottom surface slope upward from the leading edge to the trailing edge along the transverse direction.

2. The filter assembly of claim 1, wherein the leading edge is linear between the blade hub and the blade tip along the lateral direction.

3. The filter assembly of claim 1, wherein a first point on the curve is defined between the blade hub and the blade tip, wherein a second point on the curve is defined between the blade hub and the first point, wherein a third point on the curve is defined between the first point and the blade tip, wherein a first slope of the curve is defined between the first point and the second point, wherein a second slope of the curve is defined between the first point and the third point, and wherein the first slope is different from the second slope.

4. The filter assembly of claim 3, wherein the first point is a midpoint of the curve.

5. The filter assembly of claim 4, wherein the midpoint of the curve is between approximately 0.035 inches and approximately 0.075 inches above the leading edge along the vertical direction.

6. The filter assembly of claim 3, wherein the second slope is greater than the first slope.

7. The filter assembly of claim 6, wherein an apex of the curve is between approximately 0.036 inches and approximately 0.076 inches above the leading edge along the vertical direction.

8. The filter assembly of claim 7, wherein the apex is a midpoint of the curve.

9. The filter assembly of claim 1, wherein each of the pair of opposing blades comprises:

a leading edge defined between the blade hub and the blade tip along the lateral direction;

a trailing edge spaced apart from the leading edge along both the vertical direction and the transverse direction, the trailing edge defining a curve that extends between the blade hub and the blade tip along the lateral direction;

a top surface extending between the leading edge and the trailing edge along the circumferential direction, the top surface defining a slope between the leading edge and the trailing edge along the transverse direction; and a bottom surface spaced apart from the top surface along the axial direction, the bottom surface extending between the leading edge and the trailing edge along the transverse direction.

10. The filter assembly of claim 1, wherein the at least one of the opposing blades is configured to lift particles off of the filter panel and simultaneously expel the particles radially outward towards the discharge opening.

11. A dishwasher appliance, comprising:
a tub defining a wash chamber;
a sump;
a circulation pump for circulating a wash fluid in the sump to the wash chamber; and
a filter assembly disposed within the sump and in flow communication with the circulation pump, the filter assembly defining an axial direction, a radial direction, and a circumferential direction, the axial direction extending between a top portion of the dishwasher appliance and a bottom portion of the dishwasher appliance, the filter assembly comprising:

a filter member including a filter panel, the filter panel defining a plurality of filter opening, the filter member defining a discharge opening;

a circumferential discharge chamber disposed radially outward of the filter member, the discharge chamber in fluid communication with the filter member through the discharge opening; and a discharge blade attached to a shaft that extends through the filter member and is rotatable about the axial direction, the discharge blade positioned adjacent to the filter panel, the discharge blade defining a lateral direction, a transverse direction and a vertical direction, the discharge blade comprising:

a blade hub defining an aperture, the shaft extending through the aperture such that the discharge blade is attached to the shaft and can rotate about the axial direction; and a pair of opposing blades extending outward from the blade hub to a blade tip along the radial direction, at least one of the opposing blades comprising:

a leading edge defined between the blade hub and the blade tip along the lateral direction;

a trailing edge spaced apart from the leading edge along both the transverse and vertical direction, the trailing edge defining a curve that extends between the blade hub and the blade tip along the lateral direction; and a top surface spaced apart from a bottom surface along the vertical direction, the top surface defining a slope between the leading edge and the trailing edge along the transverse direction, wherein the trailing edge is positioned above the leading edge along the vertical direction such that both the top surface and the bottom surface slope upward from the leading edge to the trailing edge along the transverse direction.

12. The dishwasher appliance of claim 11, wherein the leading edge is linear between the blade hub and the blade tip.

13. The dishwasher appliance of claim 11, wherein a first point on the curve is defined between the blade hub and the blade tip, wherein a second point on the curve is defined between the blade hub and the first point, wherein a third point on the curve is defined between the first point and the blade tip, wherein a first slope of the curve is defined between the first point and the second point, wherein a second slope of the curve is defined between the first point and the third point, and wherein the first slope is different from the second slope.

14. The dishwasher appliance of claim 13, wherein the first point is a midpoint of the curve defined by the trailing edge.

15. The dishwasher appliance of claim 13, wherein the second slope is greater than the first slope.

16. The dishwasher appliance of claim 11, wherein an apex of the curve is between approximately 0.036 inches and approximately 0.076 inches above the leading edge along the vertical direction.

17. The dishwasher appliance of claim 16, wherein the apex is a midpoint of the curve.

18. The dishwasher appliance of claim 11, wherein each of the pair of opposing blades comprises:
- a leading edge defined between the blade hub and the blade tip along the lateral direction;
- a trailing edge spaced apart from the leading edge along both the transverse and vertical direction, the trailing edge defining a curve that extends between the blade hub and the blade tip along the lateral direction; and
- a top surface spaced apart from a bottom surface along the vertical direction, the top surface defining a slope between the leading edge and the trailing edge along the transverse direction.

* * * * *